(12) United States Patent
Zilber

(10) Patent No.: US 9,128,661 B2
(45) Date of Patent: Sep. 8, 2015

(54) COMMUNICATION BLOCKS HAVING MULTIPLE-PLANES OF DETECTION COMPONENTS AND ASSOCIATED METHOD OF CONVEYING INFORMATION BASED ON THEIR ARRANGEMENT

(75) Inventor: David Zilber, Matthews, NC (US)

(73) Assignee: MED et al, Inc., Matthews, NC (US)

( * ) Notice: Subject to any disclaimer, the term of this patent is extended or adjusted under 35 U.S.C. 154(b) by 1150 days.

(21) Appl. No.: 12/166,831

(22) Filed: Jul. 2, 2008

(65) Prior Publication Data

US 2010/0001923 A1 Jan. 7, 2010

(51) Int. Cl.
| | |
|---|---|
| *G06F 3/14* | (2006.01) |
| *A63F 3/00* | (2006.01) |
| *A63F 13/98* | (2014.01) |
| *A63H 33/04* | (2006.01) |
| *A63F 9/10* | (2006.01) |
| *A63F 9/24* | (2006.01) |
| *A63F 11/00* | (2006.01) |

(52) U.S. Cl.
CPC .......... *G06F 3/1431* (2013.01); *A63F 3/00643* (2013.01); *A63F 13/02* (2013.01); *A63H 33/042* (2013.01); *G06F 3/1446* (2013.01); *A63F 3/00094* (2013.01); *A63F 2003/00652* (2013.01); *A63F 2009/1061* (2013.01); *A63F 2009/245* (2013.01); *A63F 2009/2488* (2013.01); *A63F 2011/0081* (2013.01); *A63F 2300/1068* (2013.01); *A63F 2300/301* (2013.01); *A63F 2300/8094* (2013.01); *G09G 2300/026* (2013.01); *G09G 2370/16* (2013.01)

(58) Field of Classification Search
CPC ... G06F 1/1637; G06F 1/1647; G06F 1/1649; G06F 3/1446; G09G 2360/04; G09G 2356/00

USPC .................................................. 345/1.1–2.3
See application file for complete search history.

(56) References Cited

U.S. PATENT DOCUMENTS

| | | |
|---|---|---|
| 312,240 A | 2/1885 | Anderson |
| 2,839,844 A | 4/1953 | Lehnkering |
| 3,237,341 A | 3/1966 | Janning |
| 3,556,529 A | 1/1971 | Noriega |

(Continued)

OTHER PUBLICATIONS

Bug Labs, available at http://buglabs.net, dated Apr. 1, 2008, 3 pages.

(Continued)

*Primary Examiner* — Kenneth Bukowski
(74) *Attorney, Agent, or Firm* — Womble Carlyle Sandridge & Rice LLP

(57) ABSTRACT

An apparatus is provided that includes a housing, a display, a communication interface, a processor, and a plurality of detection components each of which is located proximate a respective face of the housing. At least two of the faces of the housing proximate to which two of the respective detection components are located are adjoining faces lying in planes that cut one another, the apparatus thereby supporting a two-dimensional arrangement of apparatuses. The apparatus and other apparatuses may be formed into an arranged group of apparatuses, and in such instances, the processor is configured to receive corresponding indications from the detection components, and data from the other apparatuses in the group via the communication interface. The processor is configured to calculate an output as a function of the number of apparatuses and their arrangement, and configured to communicate the calculated output via the display.

20 Claims, 8 Drawing Sheets

(56) References Cited

U.S. PATENT DOCUMENTS

| | | | |
|---|---|---|---|
| 3,654,706 | A | 4/1972 | Perrella |
| 3,696,548 | A | 10/1972 | Teller |
| 4,212,118 | A | 7/1980 | Baldwin et al. |
| 4,333,258 | A | 6/1982 | McCaslin |
| 4,684,869 | A | 8/1987 | Kobayashi et al. |
| 4,746,981 | A | 5/1988 | Nadan et al. |
| 4,820,236 | A | 4/1989 | Berliner et al. |
| 4,936,780 | A | 6/1990 | Cogliano |
| 5,013,245 | A | 5/1991 | Benedict |
| 5,346,399 | A | 9/1994 | Sakow |
| 5,823,782 | A | 10/1998 | Marcus et al. |
| 5,941,714 | A | 8/1999 | Gorbet et al. |
| 5,991,693 | A | 11/1999 | Zalewski |
| 6,243,074 | B1 | 6/2001 | Fishkin et al. |
| 6,271,453 | B1 | 8/2001 | Hacker |
| 6,685,479 | B1 | 2/2004 | Ghaly |
| 6,745,038 | B2 | 6/2004 | Callaway, Jr. et al. |
| 6,829,222 | B2 | 12/2004 | Amis et al. |
| 7,184,423 | B2 | 2/2007 | Bryan et al. |
| 7,252,572 | B2 | 8/2007 | Wright et al. |
| 2003/0148700 | A1* | 8/2003 | Arlinsky et al. ............ 446/91 |
| 2005/0253778 | A1* | 11/2005 | Ku et al. ................ 345/1.3 |
| 2006/0154711 | A1* | 7/2006 | Ellis et al. ................ 463/1 |
| 2006/0172787 | A1 | 8/2006 | Ellis et al. |
| 2006/0215476 | A1 | 9/2006 | Owen |
| 2007/0205962 | A1* | 9/2007 | Thompson ............... 345/2.3 |
| 2007/0222344 | A1 | 9/2007 | Kornbluh et al. |
| 2009/0273560 | A1 | 11/2009 | Kalanithi et al. |

OTHER PUBLICATIONS

Bug Labs: Products, available at http://buglabs.net/products, dated Apr. 1, 2008, 6 pages.
http://www.gadgetell.com/tech/print/siftables-a-prototype-for-little-computers-that-could/, dated Mar. 18, 2008, 1 page.
http://web.media.mit.edu/~dmerrill/siftables.html, dated Mar. 18, 2008, 3 pages.
http://web.media.mitedu/~jeevan/pp./connectibles.html, dated Mar. 18, 2008, 3 pages.
http://web.media.mit.edu/~jeevan/pp./siftables.html, dated Mar. 18, 2008, 2 pages.
The Lab Gear, available at http://www.picciotto.org/math-ed/manipulatiaves/lab-gear.html, dated Mar. 18, 2008, 4 pages.
http://gizmodo.com/368298/mit-media-labs-siftables-are-cool-but-ultimately-useless, dated Mar. 18, 2008, 5 pages.
http://mimitchi.com/tamaplus/manual.shtml, dated Mar. 18, 2008, 8 pages.
Kawakami et al., "Proposal for the Object Oriented Display: The Design and Implementation of the MEDIA$^3$", available at http://projects.tachilab.org/MEDIA/media3/icat.pdf, dated Jul. 2, 2008, 6 pages.
Merrill et al., "Siftables: Towards Sensor Network User Interfaces", http://web.media.mit.edu/~dmerrill/publications/dmerrill_siftables.pdf, dated available at Jul. 2, 2008, 4 pages.
Gorbet et al, Triangles: Tangible Interface for Manipulation and Exploration of Digital Information Topography, Proceedings of CHI 1998, pp. 1-8.
Resnick et al, Programmable Bricks: Toys to think with, IBM Systems Journal, vol. 35, Nos. 3 & 4, 1996, pp. 443-452.
Camarata et al, Navigational Blocks Navigating Information Space with Tangible Media, Design Machine Group, Dept of Architecture, University of Washington, 2002, pp. 31-28.
Rekimoto et al, Data Tiles: A Modular Platform for Mixed Physical and Graphical Interactions, SIG-CHI 2001, pp. 1-8.
Watanabe et al, The Soul of Active Cube-Implementing a Flexible, Multimodal, Three-Dimensional Spatial Tangible Interface, ACM Computers in Entertainment, vol. 2, No. 4, Oct. 2004, article 6b, pp. 1-13.
United States Patent and Trademark Office Communication dated Jul. 6, 2012 relating to U.S. Appl. No. 12/166,800, filed Jul. 2, 2008.

* cited by examiner

COMMUNICATION BLOCKS HAVING MULTIPLE-PLANES OF DETECTION COMPONENTS AND ASSOCIATED METHOD OF CONVEYING INFORMATION BASED ON THEIR ARRANGEMENT

FIELD OF THE INVENTION

Exemplary embodiments of the present invention generally relate to a system and method for conveying information, and more particularly, relates to communication blocks having multiple-planes of detection components, and an associated method of conveying information based on their arrangement, such as to facilitate teaching basic arithmetic concepts.

BACKGROUND OF THE INVENTION

One common toy used for interactive development of a child's mathematical ability is the familiar building blocks. These blocks often contain either letters or numbers on their sides and are used by a teacher who instructs a child in the blocks' face significance. Traditional building blocks allow children to learn important developmental concepts such as quantity and spelling, while also improving their motor control skills as they manipulate the blocks. But with little or no prior knowledge of these ideas, the child must rely on the teacher to guide and show him/her exactly what quantity they see or what words they are spelling. The blocks, once printed, can display only one number on each face. This limitation, however, may not only prove to be problematic when blocks are lost, but limit functionality (for example, number blocks will always display numbers). Furthermore, traditional blocks often offer a very static level of aesthetics, which may play an important role in the motivation of the child.

In view of the foregoing, it would be desirable to provide an improved apparatus and method configured or otherwise configurable to dynamically output desired information in a way that is both visually appealing and motivating for its user. It may also be desirable for such an apparatus and method to include an appropriate feedback component that may perform some, if not all, of the functions of a teacher in the context of traditional building blocks. And further, it may be desirable for such an apparatus and method to be configurable to permit different functionality, such as to increase the levels of teaching lessons that may be provided to a user.

SUMMARY OF THE INVENTION

In view of the foregoing background, exemplary embodiments of the present invention provide an improved system and method for interacting with a plurality of apparatuses, such as a plurality of blocks. According to one aspect of the present invention, an apparatus (e.g., block) is provided that includes a housing with a plurality of faces, a display configured to present information to a user, and a communication interface configured to exchange data with a plurality of other apparatuses. The apparatus also includes a plurality of detection components each of which is located proximate a respective face of the housing, where each of the detection components is configured to detect proximity of a respective face of the housing of the apparatus with respect to one or more of the other apparatuses. At least two of the faces of the housing proximate to which two of the respective detection components are located comprise adjoining faces lying in planes that cut one another, the apparatus thereby supporting a two-dimensional arrangement of apparatuses.

The apparatus also includes a processor configured to communicate with the display, communication interface and detection components. The apparatus and other apparatuses may be grouped and arranged in proximity with one another to form an arranged group of apparatuses. And in such instances the processor is configured to receive corresponding indications from the detection components, and receive data from the other apparatuses in the group via the communication interface. The processor is configured to calculate an output as a function of the number of apparatuses in the group and arrangement of one or more apparatuses in the group, where the number and arrangement are determinable based upon the indications and received data. The processor, then, is configured to communicate the calculated output via the display.

The processor may be configured to determine an orientation of the apparatus with respect to one or more other apparatuses of the group of apparatuses, and in such instances, may be configured to calculate the output further as a function of the orientation of the apparatus. More particularly, for example, the processor may be configured to determine an orientation of information presented by the display with respect to information presented by a display of each of one or more other apparatuses of the group of apparatuses.

The display may include a plurality of displays each of which is located on a respective face of the housing. The detection components may then be configured to detect an orientation of the apparatus, and in response to corresponding indications from the detection components, the processor may be configured to identify an upwardly-facing face of the housing as an interactive face for presentation of information by the display located thereon. Similarly, the detection components may be configured to detect a change in orientation of the apparatus resulting in another face of the housing becoming the upwardly-facing face. Then, in response to corresponding indications from the detection components, the processor may be configured to identify the other face as the upwardly-facing face as the interactive face for presentation of information by the display located thereon.

The apparatus may also include a user input interface configured to receive input from the user, and the communication interface may be further configured to exchange data with a computer during a programming of the apparatus for operation. And during programming of the apparatus, the user input interface may be configured to receive input from the user to select the apparatus, and the communication interface may be configured to communicate the selection of the apparatus to the computer for receipt thereat. In this regard, the computer may also be configured to receive selection of one or more conditional programming statements within which to reference the selected apparatus.

Also during programming of the apparatus, the communication interface may be further configured to exchange data with a computer. In this regard, the processor may be configured to record one or more actions of the apparatus directed by the user and a state of the apparatus relative to the one or more actions. The communication interface then may be configured to communicate the recorded one or more actions and state to the computer for reference in one or more conditional programming statements.

The apparatus may further include a user interface configured to communicate information to the user, where the user interface includes the display. During programming of the apparatus, and when the communication interface is configured to exchange data with the computer, the computer being configured to receive selection of the apparatus and one or more conditional programming statements within which to reference the selected apparatus. The communication interface may be configured to receive the selection of the apparatus, and the user interface may be configured to provide feedback to the user to thereby permit the user to confirm selection of the apparatus.

The apparatus may be configured to operate in a standby mode and an operation mode. In the standby mode, the processor may be configured to assign a unique group identifier to the apparatus. During operation in the operation mode, the apparatus may be grouped with a plurality of other apparatuses each of which has an assigned unique group identifier. The processor may then be configured to maintain the assigned group identifier or reassign a group identifier to the apparatus so that all of the apparatuses of the group have a common group identifier.

One of the other apparatuses may be configured to function as a utility apparatus for selecting apparatuses in the group of apparatuses. And when the utility apparatus is placed in proximity with the apparatus to select the apparatus, the processor may be configured to receive corresponding indications from the detection components and, in response thereto, calculate an output reflecting selection of the apparatus by the utility apparatus, and communicate the calculated output via the display. Similarly, the utility apparatus may be further for de-selecting selected apparatuses. In this regard, when the utility apparatus is placed in proximity with the apparatus after having been placed in proximity with the apparatus to select the apparatus, the processor may be configured to receive corresponding indications from the detection components and, in response thereto, calculate an output reflecting de-selection of the apparatus by the utility apparatus, and communicate the calculated output via the display.

According to other aspects of the present invention, a system and method of are provided. Exemplary embodiments of the present invention therefore provide an improved system, apparatus and method. As indicated above, and explained below, exemplary embodiments of the present invention may solve problems identified by prior techniques and provide additional advantages.

BRIEF DESCRIPTION OF THE DRAWINGS

Figure 2:
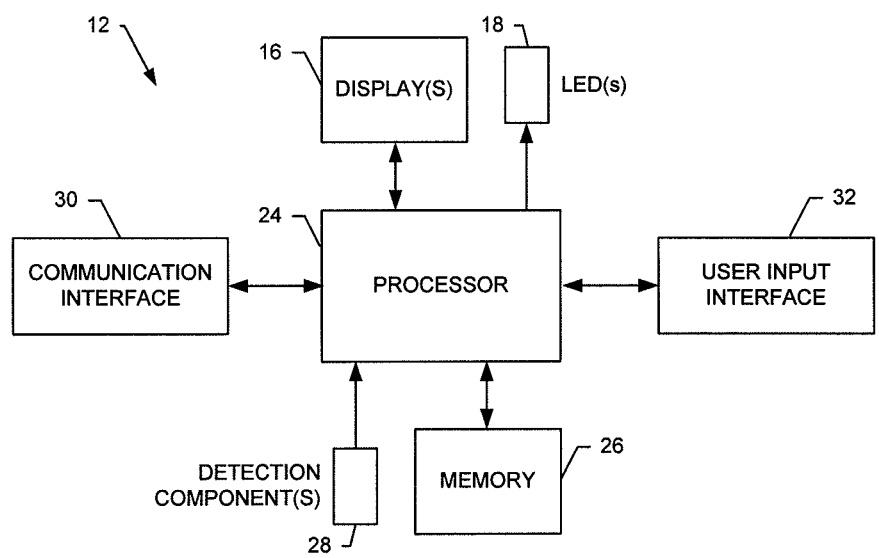
Figure 3:
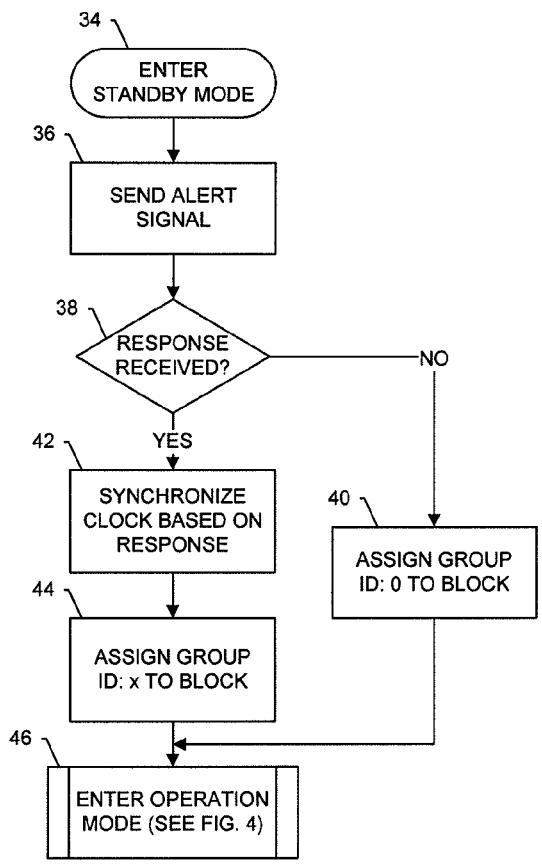
Figure 4:
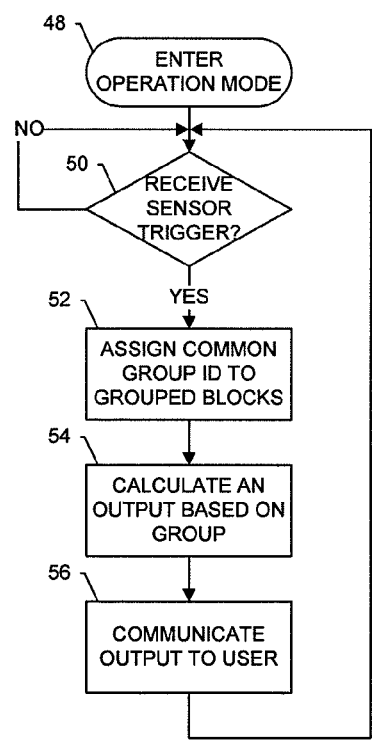
Figure 5A:
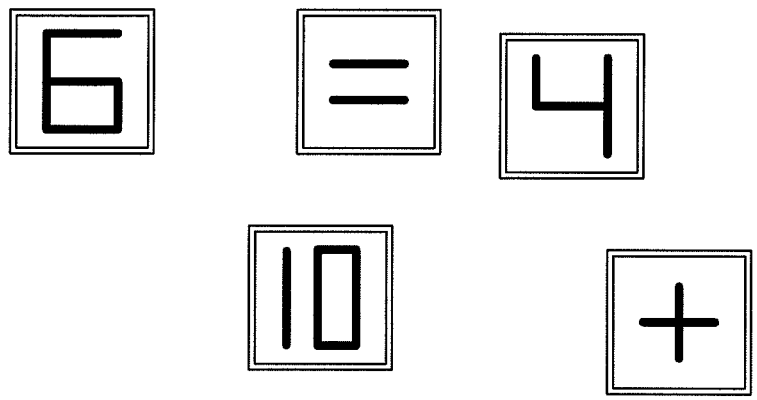
Figure 5B:
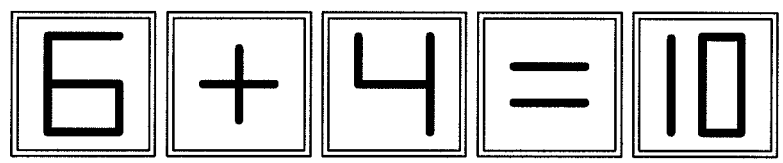
Figure 6A:
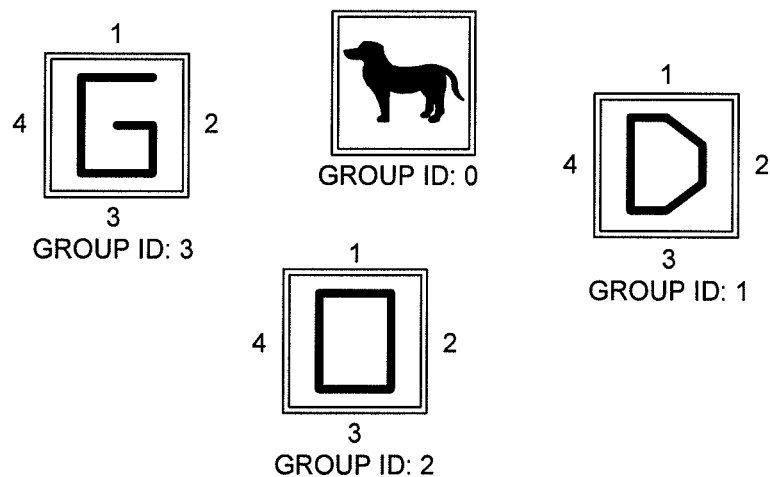
Figure 6B:
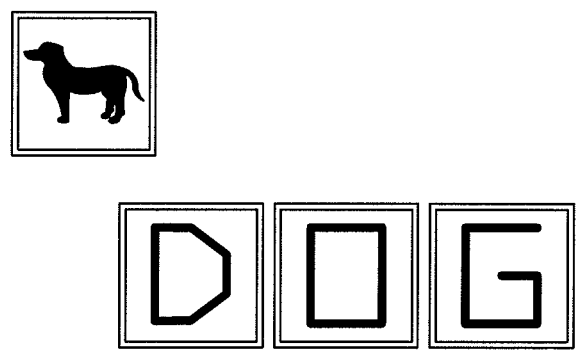
Figure 7A:
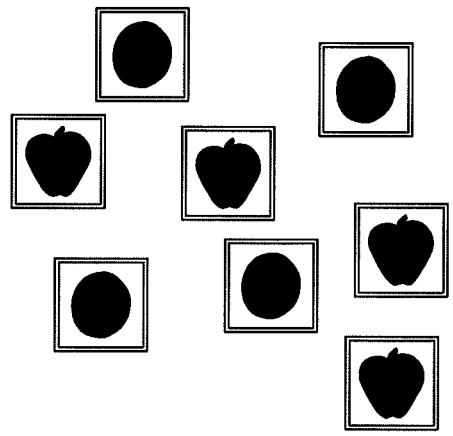
Figure 7B:
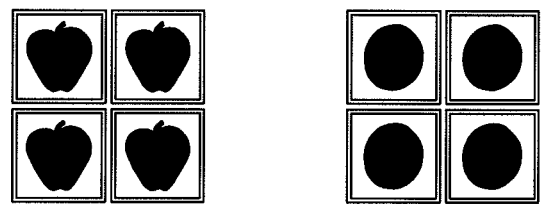
Figure 8A:
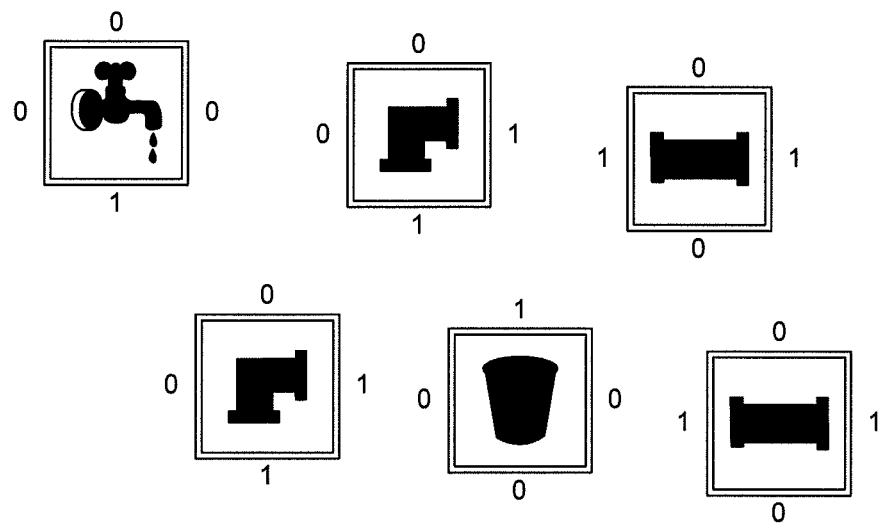
Figure 8B:
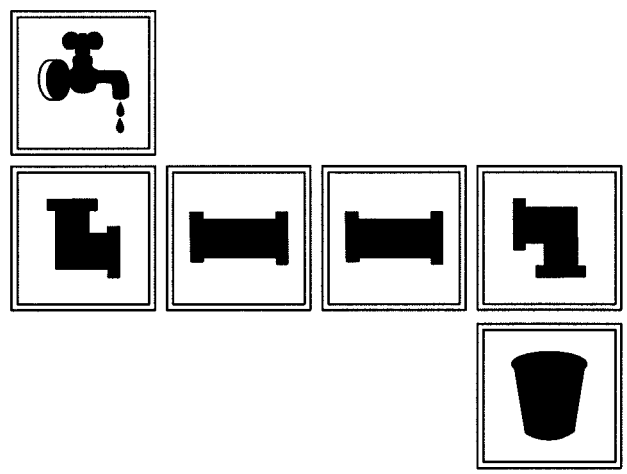
Figure 9A:
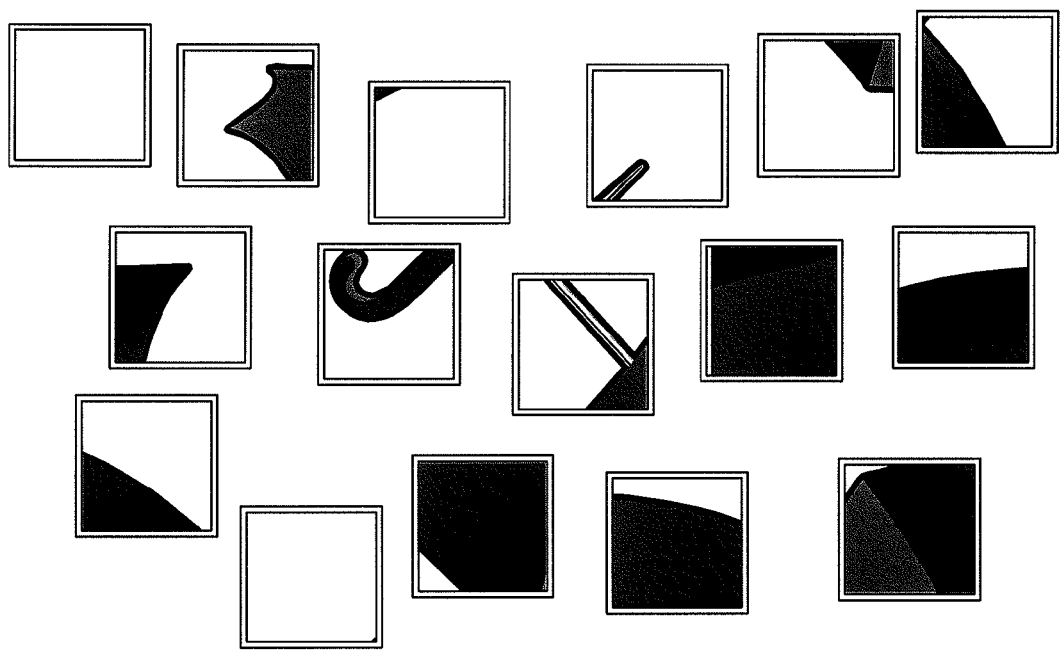
Figure 9B:
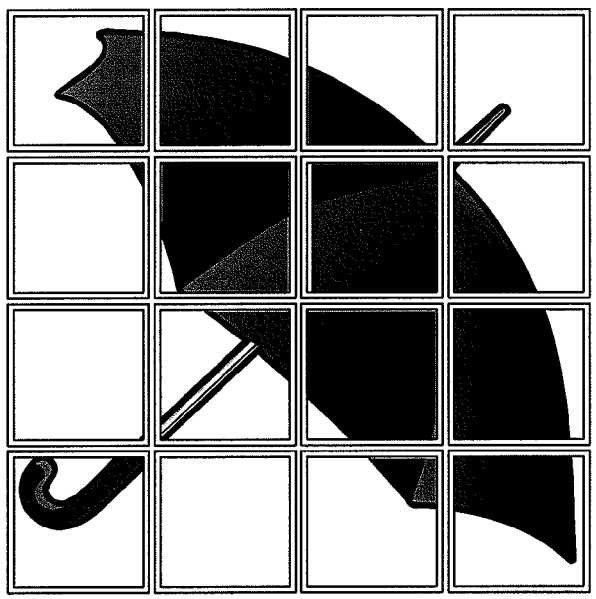

Having thus described the invention in general terms, reference will now be made to the accompanying drawings, which are not necessarily drawn to scale, and wherein:

FIG. 1 is a schematic plan view of a system of a plurality of communication blocks, according to exemplary embodiments of the present invention;

FIG. 2 is a functional block diagram of a communication block, in accordance with exemplary embodiments of the present invention;

FIGS. 3 and 4 are flowcharts illustrating various steps in a method of operating a block in a standby mode and an operation mode, respectively, according to exemplary embodiments of the present invention;

FIGS. 5a and 5b illustrate a group of blocks unarranged and then arranged according a mathematical operations application of exemplary embodiments of the present invention;

FIGS. 6a and 6b illustrate a group of blocks unarranged and then arranged according a spelling operations application of exemplary embodiments of the present invention;

FIGS. 7a and 7b illustrate a group of blocks unarranged and then arranged according an apples/oranges application of exemplary embodiments of the present invention;

FIGS. 8a and 8b illustrate a group of blocks unarranged and then arranged according a pipedream application of exemplary embodiments of the present invention; and FIGS. 9a and 9b illustrate a group of blocks unarranged and then arranged according a jigsaw puzzle application of exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Figure 1A:
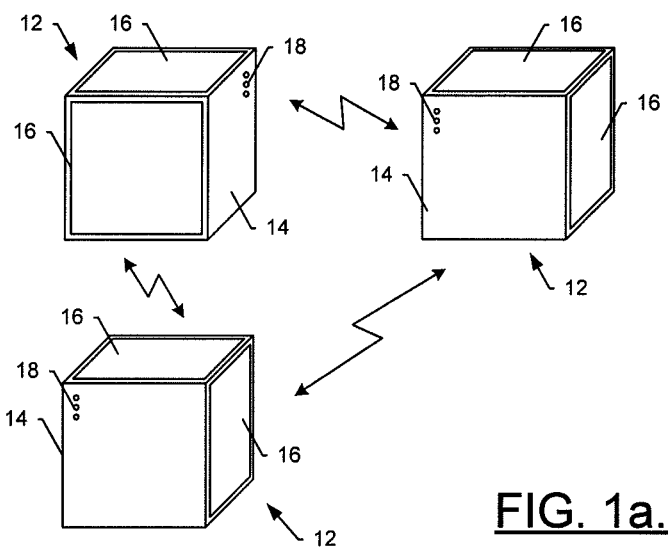
Figure 1B:
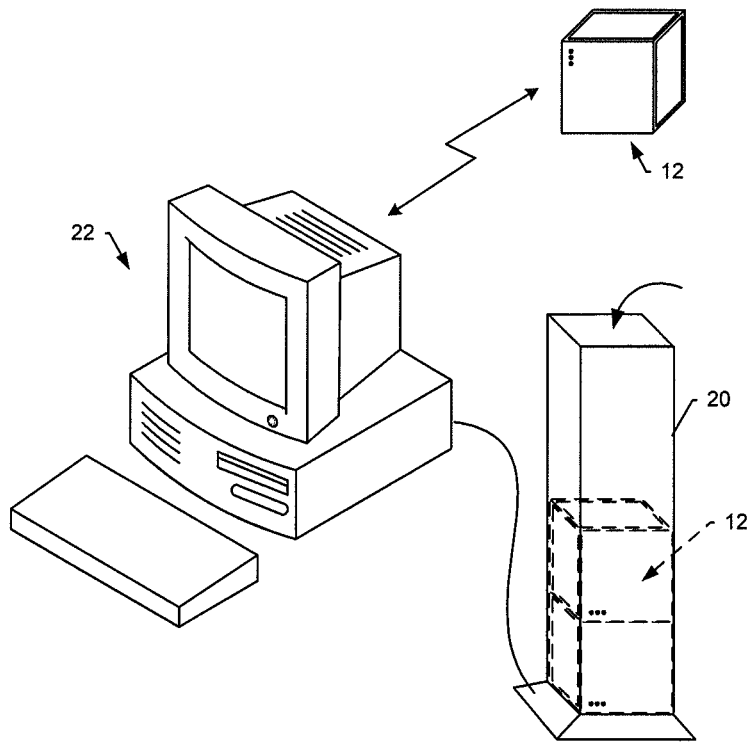

FIGS. 1a and 1b schematically illustrate a system of a plurality of blocks 12 (three exemplary blocks being shown) configured to communicate with one another, according to one exemplary embodiment of the present invention. Each block may have any of a number of different form factors (size, shape, etc.), which may be the same or different from one block to the next. As shown, for example, the blocks may include a cube-shaped housing 14; although the housing of one or more of the blocks may alternatively have another geometric shape such as a cylinder, cone, arch, prism, pyramid or the like. The blocks may be configured to communicate with one another in accordance with a number of different wireline and/or wireless communication techniques, such as in a manner forming a personal area network (PAN). More particularly, for example, the blocks may be configured to communicate with one another in accordance with a number of different short-range wireless communication techniques including, for example, infrared or radio frequency (e.g., Bluetooth, ultra-wideband—UWB, ZigBee, etc.) techniques.

As also shown, the blocks 12 of the system may further include a user interface configured to communicate information to a user. The user interface of each block may include, for example, one or more displays 16 (e.g., LCD display), light-emitting diodes 18 (LEDs), and/or speakers or other sound-producing components (not shown) on one or more faces or surfaces of the respective block. As shown in the example of a cube-shaped housing 14, the user interface of each block may include display(s) and LEDs and/or speakers on different faces of the block. It should be understood, however, that each block may include multiple displays on respective faces of the block, and may include LEDs and/or speakers on multiple faces of the block, where a display, LEDs and/or speaker may be on the same or different faces.

As further shown in FIG. 1b, the system may further include a charging or docking station 20 for the blocks 12. This station, in turn, may be coupled to a power source for charging the blocks. In one exemplary embodiment, the docking station may include a channel for receiving the blocks such that the blocks contact one another while within the channel. The docking station and blocks may therefore be configured such that the blocks are chargeable by electromagnetic induction. It should be understood, however, that the docking station may take any of a number of other forms, and may charge the blocks according to any of a number of other techniques.

The docking station 20 may be coupled to a computer 22 or other computing apparatus for interfacing the blocks 12 to the computer, such as to program functionality of the blocks. It should be understood, however, that one or more of the blocks may additionally or alternatively interface with the computer according to any one or more of a number of other wireline and/or wireless techniques. These techniques may include wireline communication techniques such as universal serial bus (USB), FireWire or the like, and/or wireless communication techniques such as the aforementioned infrared or radio frequency (e.g., Bluetooth, ultra-wideband—UWB, ZigBee, etc.) techniques.

Reference is now made to FIG. 2, which illustrates functional a block diagram of a communication block 12, in accordance with exemplary embodiments of the present invention. The communication block may include various means for performing one or more functions in accordance with exemplary embodiments of the present invention, including without limitation those more particularly shown and described herein. As shown, for example, the block may include a processor 24 (e.g., microcontroller) connected to the user interface (e.g., display 16, LEDs 18, speaker, etc.), as well as to a memory 26. The memory include comprise volatile and/or non-volatile memory configured to store content, data, software including computer-readable or otherwise executable instructions or the like. Although described herein as being implemented in software, it should be understood that any one or more of the functions described herein may alternatively be implemented in firmware or hardware.

In addition to the user interface (e.g., display 16, LEDs 18, speaker, etc.) and memory 26, the processor 24 may also be connected to one or more detection components 28, such as one or more sensors, transducers, switches or the like, although not all detection components need be connected to the processor. The detection components of a block may be configured to detect or otherwise sense (or operate in conjunction with one or more other detection components to detect) an orientation, position and/or proximity of the block with respect to one or more other blocks, and/or an orientation of one or more faces or surfaces of a block with respect to one or more other faces or surfaces of that block. In this regard, a block may include multiple instances of a user interface element and detection component, one for each of multiple faces of the respective block. For example, a block may include six displays disposed on, and six detection components disposed on or otherwise proximate, the six faces of the cube-shaped housing 14 of a block.

The detection components 28 more particularly may include, for example, a Reed switch, proximity switch/sensor, single or multi-axis accelerometer, a touch-sensitive surface (e.g., capacitive touch-sensitive surface), infrared transmitter/receiver or the like. As will be appreciated, in various instances, a detection component may be coupled with another detection component to enable detection of the orientation of a block or a block's face, such as in the case of a Reed switch being operable with a magnet, or in the case of an infrared transmitter being operable with an infrared receiver. In one particular example, a block may include one or more pairs of Reed switches and magnets, which may be situated or otherwise structured on the block to provide a measure of isolation between the Reed switch and magnet. In this example, including a Reed switch/magnet pair enables the block to not only detect the proximity of another block, but in the case in which the other block also includes a Reed switch/magnet pair, also enable the other block to detect the proximity of it. Similar, for example, a block may include one or more infrared transceivers (or separate pairs of infrared transmitters and receivers), which may be situated or otherwise structured on the block to permit infrared communication between adjacent blocks such that including infrared transceivers enables blocks to not only detect the proximity of one another, but also communicate with one another according to an infrared communication technique.

As another example, a detection component 28 may comprise a capacitive touch-sensitive surface operable with a component that exhibits capacitance and may therefore alter the reference capacitive field of the touch-sensitive surface. Similar to the case of the Reed switch/magnet pair, this touch-sensitive surface and component, then, may be situated or otherwise structured on the block to provide a measure of isolation between the touch-sensitive surface and component. Further, the touch-sensitive surface/component pair may enable the block to not only detect the proximity of another block, but in the case in which the other block includes a similar touch-sensitive surface and component, also enable the other block to detect the proximity of it.

The processor 24 may also be connected to at least one interface or other means for transmitting and/or receiving data, content or the like. In this regard, the interface(s) can include at least one communication interface 30 or other means for transmitting and/or receiving data, content or the like, such as in accordance with any of the aforementioned wireline and/or wireless communication techniques. As indicated above, in various instances a communication (e.g., infrared) interface may be configured to not only transmit and/or receive data, content or the like, but also function as a detection component 28. In such instances, the block 12 may include multiple instances of a communication interface, one for each of multiple faces of the respective block.

The interface(s) may also include a user input interface 32 (where the user input interface may form part of the user interface), which may, in turn, include any of a number of devices allowing the entity to receive input from a user (operator), such as a keypad, a touch-sensitive surface (that may double as a display), a joystick or other input device. More generally, the communication block 12 may include means, such as one or more logic elements for performing various functions. As will be appreciated, the logic elements can be embodied in any of a number of different manners, such as in an integrated circuit assembly including one or more integrated circuits integral or otherwise in communication with a respective network entity or more particularly, for example, the processor of the block.

The blocks 12 of exemplary embodiments of the present invention are generally configured to permit their organization by a user into one or more groups of blocks, where similar to the blocks themselves, the group(s) may have any of a number of different shapes. The blocks of a group, then, are configured to detect one another, and communicate with one another to enable determination of the number of blocks in the group, orientation of one or more blocks of the group, and/or the arrangement of one or more blocks of the group (including non-immediately adjacent blocks) and/or the group as a whole. The blocks may then be configured to calculate an output as a function of the number of blocks in the group, orientation of one or more blocks of the group, and/or the arrangement of one or more blocks of the group and/or the group as a whole. The calculated output, then, may be communicated to the user via one or more user interface elements (e.g., display 16, LEDs 18, speaker, etc.).

The output communicated by the block(s) 12 may be calculated in accordance with functionality (e.g., software routines, instructions or the like—generally referred to herein as "applications") that may be preprogrammed or otherwise constructed into the blocks prior to their receipt by the user. In various instances, however, one or more preprogrammed applications may be modifiable by the user, or other applications may be programmed by the user operating the computer 22, and downloaded to the blocks for use thereat. The computer may enable programming or otherwise writing these applications in accordance with any of a number of standard programming languages, such as C, BASIC or the like. Additionally or alternatively, however, the computer may include dedicated software for programming applications of the blocks, such as in a manner that does not require prior programming knowledge or experience.

In instances in which the computer 22 includes dedicated software for programming the blocks 12, the dedicated software may include a user interface that permits a user to enter one or more basic commands, which the software may then translate into a native language of the blocks. Depending on the configuration of the dedicated software, entering of basic commands by the user may be accomplished in a number of manners. In one example, one or more commands may be chosen by the user from a library of available commands that may be presented to the user (e.g., pop-up library of available commands), where the presented commands may include the entire library, or a subset of the library including commands ("suggested commands") selected by the dedicated software, such as based on the context of previously entered commands.

In another example of entering basic commands according which the blocks may be programmed, the dedicated software may present one or more selectable dynamic commands, one or more of which may comprise dynamic conditional statements. In this regard, a dynamic command may comprise a command that includes one or more portions (e.g., blanks) for receiving user input. One example of such a command may be the following:

WHEN SIDE _____ TOUCHES _____, THEN _____ HAPPENS.

The user input may be received in a number of different manners, such as by receiving selection of a particular portion of a selected command, and presenting a list of one or more possible inputs into the selected portion. The user input into these commands may include, for example, specification or selection of one or more blocks, one or more faces (sometimes referred to as "sides") of one or more blocks, one or more actions (e.g., display a particular image on one or more blocks), or the like. In such instances, a specified block may comprise a particular block, one of a particular plurality of blocks, or any block. Similarly, a specified face may comprise a particular face, one of a particular plurality of faces, or any face.

Further, to facilitate programming the blocks 12, the dedicated software may direct interaction between the computer 22 and respective blocks, such as in accordance with any of a number of communication techniques available between the computer and blocks. In this manner, the user may specify a block or face of a block utilizing a user input interface 32 of the block, which in turn, may communicate the respective block or face specification or selection to the computer and in turn the dedicated software. Similarly, the user may specify a block or face of a block using the user interface of the dedicated software, which in turn, may communicate the respective block or face specification or selection to the appropriate block(s). The appropriate block(s), then, may provide feedback via its user interface to thereby permit the user to confirm the specification. Even further, for example, the user may perform one or more actions with respect to one or more blocks, including placing or otherwise orienting the block(s) in a particular manner, arranging the block(s) proximate other blocks in a group, loading a particular image for display, or the like. Each of these block(s) may record the action and the state of the block relative to the action, such as by recording the number of blocks in any group within which the user placed block, the orientation of the block in the group, and/or the arrangement of one or more blocks of the group and/or the group as a whole. The actions and states may then be communicated to the computer for the dedicated software to memorialize in one or more commands. As will be appreciated, this manner of programming may be extended to the dedicated software presenting an animated representation of the blocks that may be manipulated by the user, in addition to or in lieu of the user interacting with the blocks themselves.

Regardless of the exact manner by which the user utilizes the computer 22 to program or otherwise write an application for their blocks 12, the user may then direct the computer to compile the application into the blocks native language, and transfer the compiled application to the blocks for installation and use thereon.

It should be noted that users may be capable of designing a number of different applications that may be implemented by the blocks 12. And as at least some of these applications may be useful to other users, the computer 22 may be further capable of communicating across one or more networks, such as the Internet, to upload applications to a more central host location. These applications may then be downloaded by other users' computers, and in turn, to their blocks. Further, to facilitate use of various applications by users, the host of the uploaded applications may provide a mechanism whereby the uploaded applications may be searched and/or rated by other users. Additionally or alternatively, the mechanism provided by the host may maintain, and make available to users, information related to each of a number of the uploaded programs such as the date of submission (upload), the number of downloads (popularity), the author's or another user's description of the respective application, and/or comments regarding the respective application from other users. Even further, one or more applications may have a number of versions, one or more of which may result from their being downloaded, modified and re-uploaded by a particular user.

According to exemplary embodiments of the present invention, and as shown in FIGS. 3 and 4, blocks 12 may operate in a number of different modes, including a charging mode, standby mode and operation mode. Operation of a plurality of blocks operating in a number of different modes will now be provided according to exemplary embodiments of the present invention. In the charging mode, the blocks may be placed or otherwise situated in a charging or docking station 20 to charge the blocks and/or program the blocks via the computer 22. If so desired, the user interface (e.g., LEDs 18) of each block may be configured to provide feedback to the user to indicate a current status of the block, such as by powering a red LED 18 to indicate a charging block, or a green LED to indicate a charged block; and/or by flashing a red/green LED to indicate the current exchange of information, data or the like between a charging/charged block and the computer. Further, and particularly for blocks previously operated in the standby mode and/or operation mode, placing the blocks in the station may reset those blocks as to any data, information or the like recorded or otherwise assigned to the blocks to effectuate those modes.

The blocks 12 may exit the charging mode and enter the standby mode upon their removal from the charging/docking station 20, which may be indicated by the user interface of the respective blocks such as by powering both red and green LEDs 18, as shown at 34. In this regard, when a block is placed in the standby mode, the block may transmit or otherwise send a wireless alert signal to identify any other blocks in the standby mode or operation mode, as shown at 36. If one or more other blocks are in the standby mode or operation mode, those blocks may receive the alert signal from the block, and transmit a wireless response to the alert signal, as shown at 38. Similarly any of the other blocks in the standby mode may transmit an alert signal and receive a response from the block (in the standby mode), as well as any other block in the operation mode. The response signal may indicate the presence of a particular block, but may also function as a synchronization signal to direct synchronization of the internal clocks of the blocks transmitting the alert and response signals, as shown at 42. This synchronization may be accomplished between the blocks in any of a number of different manners, following which the blocks may provide feedback to indicate their synchronization (e.g., powering green LEDs 18 of the respective blocks).

Before, after or as the block 12 sends the alert signal (regardless of whether the block receives a response to the alert signal), the block may assign itself a group identifier (ID), as shown at 44. In this regard, when the blocks are in the standby mode and upon entering the operation mode, the blocks may be ungrouped; and accordingly, each block may be assigned an individual group ID. When two or more blocks are grouped together, the group IDs of the respective blocks may be replaced by a group ID common to the blocks of the group, as explained below. The group IDs may be assigned in a number of different manners, but in one exemplary embodiment, may be assigned in order of the blocks entering the standby mode, beginning with an initial group ID (e.g., group ID: 0), as shown at 40. Thus, if a block does not receive a reply to its alert signal, such as in the case of all of the other blocks being in the charging mode, the block may assign itself group ID: 0. The next block to enter the standby mode, being made aware of the presence of the block having group ID: 0 (and synchronizing itself with the respective block), may assign itself group ID: 1. The third block to enter the standby mode, similarly being made aware of the presence of the blocks having group IDs: 0 and 1 (and synchronizing itself with the respective blocks), may assign itself group ID: 2. The process may continue in a similar manner as each block enters the standby mode.

After a block 12 synchronizes itself with any other blocks in the standby mode or operation mode, and assigns itself a group ID, the block may enter the operation mode, as shown at 46 and at 48 of FIG. 4. Generally, in the operation mode, the blocks may be organized into one or more groups of two or more blocks, where each group may have any of a number of different shapes. As indicated above, the blocks of a group may be configured to detect one another, and communicate with one another to enable one or more of the respective blocks to calculate an output as a function of the number of blocks in the group, orientation of one or more blocks of the group, and/or the arrangement of one or more blocks of the group and/or the group as a whole. The calculated output, then, may be communicated to the user via one or more user interface elements (e.g., display 16, LEDs 18, speaker, etc.).

More particularly, two or more blocks 12 in the operation mode may be placed proximate one another (e.g., in contact) to thereby group the respective blocks. This placement of the blocks, then, may trigger detection components 28 of the respective blocks to detect the proximity of the respective blocks to one another. The triggered detection components may send a notification signal the processors 24 of the respective blocks, each of which may enter an interrupt routine in response to receiving the notification signal, as shown at 50. This interrupt routine, then, may permit the blocks to assign or be assigned a common group ID, as shown at 52. As indicated above, when blocks enter the operation mode, the blocks may have individual group IDs (e.g., group IDs: 0, 1, 2, etc.), which in the operation mode, may be replaced by a common group ID when blocks are grouped together. This common group ID may be the group ID of one of the blocks (e.g., the lowest group ID). And in such instances, the blocks may communicate with one another via respective communication interfaces 30 such that the block(s) having the higher group ID(s) changes its/their group ID(s) to correspond to that of the lowest group ID. For example, the blocks may communicate with one another to exchange group IDs, with the blocks having higher group IDs replacing those IDs with the lowest received group ID. Also in such instances, to the extent necessary or otherwise desirable, the block originally having the group ID now assigned to the entire group may be designated as the master block for the respective group.

The aforementioned assignment of a group ID may at times require communication between the grouped blocks 12 to the exclusion of any other block in the operation mode. This may be accomplished, for example, through communication via a particular communication interface (e.g., infrared) and proximity of the grouped blocks to one another. In various instances, however, the grouped blocks may not be capable of communicating with one another to the exclusion of other blocks. In such instances, the grouped blocks may be configured to distinguish themselves from other blocks (blocks outside the respective group). In these instances, for example, all of the blocks may maintain a timestamp of the last instance of receiving a notification from one or more of their respective detection components 28 indicating the placement of the respective blocks to one or more other blocks. These timestamps, then, may be communicated between the blocks during assignment of the group ID to the blocks. If the timestamp received by a block from another block is within a predetermined threshold of the timestamp maintained by the respective block, a likely grouping of the block with the other block is indicated, and the block may proceed accordingly to participate in the group ID assignment. Otherwise, the block may ignore the timestamp and further communication during the group ID assignment.

Also in the operation mode, one or more blocks 12 may be removed from a group by moving the respective block(s) out of proximity of the block(s) of the group with which the respective block(s) where in proximity. This removal of a block may be communicated to one or more other blocks of the group at the time of the block's removal, or at some later time during which an output is calculated as a function of the number of blocks in the group, orientation of one or more blocks of the group, and/or the arrangement of one or more blocks of the group and/or the group as a whole. More particularly, for example, the blocks may be configured such that moving a block out of proximity of blocks of the group triggers detection component(s) 28 of the block(s) of the group with which the respective block was in proximity to send an appropriate notification signal to the processor(s) 24 of the respective block(s). This notification, then, may cause the processor(s) of the respective blocks and/or one or more other blocks to enter an interrupt routine in which removal of a block may be communicated to the block(s) of the group otherwise configured to calculate the aforementioned output, if not to all of the blocks of the group. Even further, in instances in which the master block is removed from the group, another block may be designated the group's master, such as one of the block(s) whose processor(s) generated the notification.

Similar to before, a block 12 may be added to a group by placing that block proximate one or more blocks of the group, thereby triggering detection components 28 of the respective blocks to detect the proximity of the respective blocks to one another. Similar to before, the triggered detection components may send a notification signal the processors 24 of the respective blocks, each of which may enter an interrupt routine in response to receiving the notification signal. This interrupt routine, then, may permit the block(s) of the group in proximity with the added block, the master block, or another block of the group to communicate the common group ID to the added block, which in response thereto, may update its group ID to the common group ID. In instances in which the grouped blocks may not be capable of communicating with one another to the exclusion of other blocks, the block(s) communicating the common group ID to the added block may further communicate a respective timestamp to the added block, which may compare the timestamp to its own timestamp before accepting the common group ID (the timestamps being within a predetermined threshold if the common group ID is accepted).

As indicated above, blocks 12 may be grouped together on conjunction with their organization or arrangement by a user, where similar to the blocks themselves, the group(s) may have any of a number of different shapes. The blocks of a group, then, are configured to detect one another (being able to distinguish members of the respective group by their group ID, for example), and communicate with one another to enable one or more of the blocks to calculate an output as a function of the number of blocks in the group, orientation of one or more blocks of the group, and/or the arrangement of one or more blocks of the group and/or the group as a whole, as shown at 54. The calculated output, then, may be communicated to the user via one or more user interface elements (e.g., display 16, LEDs 18, speaker, etc.), as shown at 56.

The output communicated by the block(s) 12 may be calculated in accordance with any of a number of applications installed on the respective blocks, and in various instances, the computer 22. In this regard, although a number of applications may be self-contained within the blocks, others of the applications may have portions installed on both the computer and blocks for carrying out the functionality of the respective applications. Even further, in various applications, the functionality of the applications may be effectuated by the master block of a group, which may communicate the outputs to the other blocks for output thereat, or otherwise direct the other blocks of the group to calculate their respective outputs.

In a number of applications, and in general, one or more of the faces or surfaces of the blocks 12 may be designated as being interactive in that the respective face(s) or surface(s) are those with which a user may interact during operation of the blocks. In one common example, the interactive face of a block may be the current upwardly-facing face or surface of the block, and may change as the block is reoriented such that upwardly-facing face or surface changes.

Also, one or more of the blocks 12 may function as a utility block during operation of an application, where this block may be pre-selected or otherwise selected by the user. Depending on the operating application, placement of the utility block proximate one or more other blocks may cause the output of the utility block to be singularly calculated (and communicated to the user), and/or may cause the output of the other block(s) to be singularly calculated (and communicated to the user). More particularly, for example, the utility block may function as selection tool (selecting block) for selecting or de-selecting one or more other blocks. Selecting a block in this instance may, for example, be accomplished by placing the utility block proximate (e.g., in contact) the block for a limited duration, such as by tapping the block with the utility block. That same block, then, may be de-selected by again placing the utility block proximate the block for the same or a similar limited duration, such as by again tapping the selected block with the utility block. It should be noted, however, that in various configurations, the functions of a utility block may be accomplished without a designated block. For example, in instances in which the detection components 28 include components such as an accelerometer and/or a touch-sensitive surface, handling or touching of the respective blocks by the user may cause the output of the block(s) to be singularly calculated (and communicated to the user).

To further illustrate the benefits of the blocks 12 of exemplary embodiments of the present invention, operation of the blocks according to a number of different applications will now be described. These applications may include, for example, game-related applications including educational-driven and/or entertainment-driven applications, informational applications or the like. More particularly, as explained below, game-related, educational-driven applications may include mathematical operations, spelling operations, apples/oranges, math marvel, magic square, binary tutor or the like. As also explained below, game-related, entertainment-driven applications may include, for example, pipedream, jigsaw puzzle, Simon, Concentration, Tic-Tac-Toe/Connect-4 or the like. And informational applications may include, for example, an email display, weather display, online calling or instant messaging display, countdown timer display, calendar display, clock display and/or picture display. These information applications are typically intended to provide information to the user, and may be paired with the docking station 20 and/or computer 22.

A. Mathematical Operations

According to a mathematical operations application, upon becoming operational, the blocks 12 of a group may present, on one or more of their displays 16, a number (e.g., 0, 1, 2, 3, 4, 5, 6, 7, 8, 9), mathematical operator (e.g., +, −, ×, ÷) or relationship expression (e.g., =, <, >). The user may then be directed to arrange one or more of the blocks proximate one another, including at least three presenting numbers, one presenting an operator and one presenting a relationship expression, into a correct mathematical statement. As shown in FIG. 5a, for example, a group of five blocks may present the numbers 6, 4 and 10, the operator + (mathematical plus), and the relationship expression = (mathematical equality); and the user may be directed to arrange the blocks into a mathematical statement including the respective blocks. If the user does arrange the blocks into a correct mathematical statement, as shown for example in FIG. 5b, the blocks may notify the user of the correct arrangement, such as by flashing green LEDs 18 on the respective blocks. One or more of the blocks of the group may then be configured to change their respective number, operator or relationship; and the process may begin again with the user being directed to arrange the blocks into a correct mathematical expression. If the user does not arrange the blocks into a correct mathematical statement, however, the blocks may notify the user of the improper arrangement, such as by flashing red LEDs on the respective blocks.

In various instances the user may arrange the blocks 12 into an incomplete mathematical statement in which the blocks are one short of a complete statement, or may arrange the blocks into an incorrect mathematical statement. In such instances, the user may place the utility block to complete the incomplete mathematical statement, or place the utility block on top of one of the blocks of the incorrect mathematical statement. In response, the utility block may be configured to calculate and present, on one or more of its displays 16, an output that, along with the other blocks, forms a complete, correct mathematical statement. Consider, for example, an instance in which the user arranges the blocks into the following incomplete statement: 6+4=_____; or arranges the blocks into the following incorrect statement: 6+4=7. In such instances, the user may arrange the utility block after the equality (immediately next to the equality or on top of the block presenting the number 7), from which the utility block may calculate and present the number 10, thereby forming the complete, correct mathematical statement: 6+4=10.

In various other instances, it may be desirable to have a block 12 present a larger number made up of smaller numbers presented by two or more blocks. For example, it may be desirable to have a block present the number 23 made up of smaller number 2 and 3 presented by respective blocks. In such instances, the blocks may be configured such that the smaller numbers may be merged to form the larger number by placing the blocks presenting the smaller numbers proximate one another and in the proper order to form the larger number, and tapping one of the blocks with the utility block to change the number on the respective block to the larger number, with the number of the other block remaining as before. Continuing the above example, the blocks presenting the numbers 2 and 3 may be placed proximate one another; and either the block presenting the number 2 or the block presenting the number 3 may be tapped with the utility block to change its respective number from 2 or 3 to 23.

In a similar manner, it may be desirable to have a block 12 present a smaller number in a larger number presented by a block, the larger-numbered block including the desired smaller number and a remaining smaller number. For example, it may be desirable to have a block present the number 2 in the larger number 23 presented by a block. In such instances, the blocks may be configured such that the larger number may be split by placing the larger-numbered block proximate a block presenting the remaining smaller number, with the block presenting the remaining smaller number placed proximate the side of the larger-numbered block nearest the corresponding remaining smaller number. The larger-numbered block may then be tapped with the utility block to change the larger number on the respective block to the desired smaller number, with the number of the other block remaining as before. Continuing the above example in which a block presenting the number 2 is desired, the block presenting the number 23 and a block presenting the number 3 may be placed proximate one another; and the block presenting the number 23 may be tapped with the utility block to change its respective number from 23 to 2.

B. Spelling Operations

According to a spelling operations application, upon becoming operational, a block 12 of a group of blocks may be configured to present a random (or pseudorandom) image on one or more displays 16 of the block. The other blocks of the group, then, may be directed to present respective letters of a word descriptive of the image presented on the display of the interactive face of the block, as shown in FIG. 6a for the exemplary image and letters of the descriptive word "dog." The user may then be directed to arrange the other blocks to spell the appropriate word, as shown for example in FIG. 6b. In a manner similar to that above with respect to the mathematical operations application, the blocks may indicate to the user a correct or incorrect spelling of the word (e.g., flashing green or red LEDs 18 of the blocks, presenting a new image on the interactive face, rotating the block to change the interactive face and thus the image on the interactive face, etc.). Also in a manner similar to that above, the user may place a utility block in an incomplete word or an incorrectly-spelled word, to which the utility block may respond by calculating and presenting, on one or more of its displays, a letter that, along with the letters presented by the other blocks, forms the complete, correctly-spelled word.

In a more particular exemplary embodiment, upon a first block 12 (e.g., group ID: 0) becoming operational, the block may randomly or pseudorandomly select and present one of a collection of locally-stored images on one or more displays 16 of the respective block (this block being referred to as the "image block"). The image block may then direct other blocks of the group to present (on one or more of their displays) respective letters of a word descriptive of the image, such as in order with the block with group ID: 1 being directed to present the first letter of the word, the block with group ID: 2 being directed to present the second letter of the word, the block with group ID: 3 being directed to present the third letter of the word, and so forth. In this regard, the image blocks may direct other blocks already grouped with the image block (all in the operation mode), or direct other blocks as those blocks are grouped with the image block (the other blocks proceeding through the standby mode to the operation mode). As will be appreciated, the image block may be part of a group including more blocks than necessary for presenting the image and letters of the descriptive word, and in such instances, the other blocks may still be part of the group but may not be considered active.

Upon the other blocks 12 of the group presenting letters of the descriptive word, the user may be directed to arrange the other blocks to spell the appropriate word, with the process proceeding in a manner explained above. As blocks are placed proximate one another and/or at predetermined intervals (e.g., every five seconds), one or more blocks of the group may be configured to check letter order and orientation so as to determine whether the user has correctly spelled the appropriate word (or is in the process of correctly spelling the appropriate word). That is, the block(s) may be configured to check if the arranged blocks present letters of the descriptive word and in the correct order (the blocks in this example being able to detect one another and, know that the order of their group IDs corresponds to the correct order of the letters of the word). In addition, the blocks may be configured to check if the arranged blocks are arranged such those blocks have the same orientation as to the display of their respective letters.

Checking the orientation of the blocks may be accomplished, for example, by the blocks assigning a value to each side of the interactive face (e.g., 1-4), where each value may correspond to an orientation (e.g., normal, 90° clockwise, 90° counterclockwise, upside-down) of the displayed letter. One or more of the blocks may then determine for any particular side of a block adjacent a side of another block, if the side of the other block is assigned the same value as the value of the side parallel the particular side of the respective block. Thus, presume the interactive face of each of two blocks has sides valued 1, 2, 3 and 4, where sides 1 and 3 are parallel one another, and sides 2 and 4 are parallel one another. Once the blocks are placed adjacent one another, one or both of those blocks, or another block, may determine if side 2 of one block is adjacent side 4 of the other block, or if side 1 of one block is adjacent side 3 of the other block. These situations may be indicative of the letters presented on the interactive faces being in the same orientation with respect to one another. And although not explicitly described herein, others of the applications according to which the blocks may be configured to operate may include similar functionality to include, as part of the proper arrangement of blocks, a determination as to the blocks having the same or other proper orientation.

C. Apples/Oranges

According to an apples/oranges application, each of the blocks 12 of a group may be configured to randomly (or pseduorandomly) present one of a set of images (e.g., apple, orange) on one or more of their respective displays 16, as shown in FIG. 7a for the exemplary images of apples and oranges. The user may then be directed to arrange the blocks into sub-groups such that all of the blocks of each sub-group are presenting the same image, as shown in FIG. 7b. In a manner similar to that above, the blocks may indicate to the user correct or incorrect sub-groupings of the blocks (e.g., flashing green or red LEDs 18 of the blocks, presenting new images on the blocks, etc.). As explained herein, blocks arranged into sub-groups may be considered separate groups for purposes of those blocks functioning in their operation mode, including for example, in the assignment of their respective group IDs.

D. Math Marvel

A math marvel application may function in a manner similar to the mathematical operations application in that, upon becoming operational, the blocks 12 of a group may present, on one or more of their displays 16, a number (e.g., 0, 1, 2, 3, 4, 5, 6, 7, 8, 9), mathematical operator (e.g., +, −, ×, ÷) or relationship expression (e.g., =, <, >). According to the math marvel application, the numbers, operators and relationship expressions presented by the blocks may be selected such that the blocks may be arranged in one or more sub-groups each of which includes blocks forming a correct mathematical statement. The user may then be directed to arrange the blocks into sub-groups such that the blocks of a sub-group, when properly arranged within the respective sub-group, form a correct mathematical statement, with the object being to account for all of the blocks in one of the sub-groups forming a correct mathematical expression. The user may arrange the blocks into multiple sub-groups at approximately the same time, or arrange the blocks into sub-groups one at a time. Further, the blocks may be configured such that once the blocks are arranged into a correct mathematical statement, the numbers, operator and/or relationship expression may be cleared from the displays of the respective blocks. Once again, in a manner similar to that above, the blocks may indicate to the user correct or incorrect sub-groupings of the blocks (e.g., flashing green or red LEDs 18 of the blocks, presenting new numbers, operators and/or relationship expressions on the blocks, etc.).

For example, presume a group of ten blocks 10, six of which present the numbers 3, 5, 7, 15, 21 and 75, two of which present the multiplication and division operators × and ÷, and two of which present the equality relationship expression =. In this instance, the numbers, operators and relationship expressions are selected such that all of the blocks may only be accounted for in two sub-groups, one including the numbers 5, 15 and 75; and the other including the numbers 3, 7 and 21. The user may then be directed to arrange the blocks into the appropriate sub-groups, and arrange the blocks of each sub-group into a correct mathematical statement (e.g., 5×15=75; and 21÷7=3). In this instance, it should be appreciated that although the numbers must be grouped as indicated to be able to account for all of the blocks in a correct mathematical statement, the user may switch the operators (and accordingly modify the arrangement of the numbers within each sub-group) and still achieve the desired two sub-groups each forming a correct mathematical statement.

E. Magic Square

According to a magic square application, upon becoming operational, the blocks 12 of a group may present, on one or more of their displays 16, a number (e.g., 0, 1, 2, 3, 4, 5, 6, 7, 8, 9). The numbers presented by the blocks may be selected such that the blocks may be arranged in a grid including one or more columns and rows the numbers of each of which all sum to the same number. The user may then be directed to accordingly arrange the blocks into the appropriate grid. As the blocks are arranged in a column or row, the last block in a particular column or row may be configured to determine the numbers of the other blocks in the respective column or row (or receive indications of those numbers from the other blocks), and detecting its placement relative to the other blocks in the respective column or row, modify its display to not only present its number but also present the sum of the numbers of the other blocks in the respective column or row. Similar to the aforementioned applications, the blocks may indicate to the user correct or incorrect arrangement of the blocks (e.g., flashing green or red LEDs 18 of the blocks, presenting new numbers on the blocks, etc.).

For example, presume a group of nine blocks 10 presenting the numbers 1, 2, 3, 4, 5, 6, 7, 8, 9. In this instance, the numbers are selected such that the blocks may be arranged into a three-by-three grid of blocks, where the sum of the numbers in each column and row may sum to 15, such as in accordance with the following:

816
357
492

F. Binary Tutor

A binary tutor application may function in a manner similar to the spelling operations application in that, upon becoming operational, a block 12 of a group of blocks may be configured to present a random (or pseudorandom) decimal number on each of one or more displays 16 of the block. The other blocks of the group, then, may be directed to present respective binary numbers 0 and 1 of the binary equivalent of the decimal number presented on the display of the interactive face of the block. The user may then be directed to arrange the other blocks in the proper order to form the binary-equivalent number. Once again, the blocks may indicate to the user a correct or incorrect spelling of the word (e.g., flashing green or red LEDs 18 of the blocks, presenting a new decimal number on the interactive face, rotating the block to change the interactive face and thus the decimal number on the interactive face, etc.).

G. Pipedream

According to a pipedream application, upon becoming operational, a number of blocks 12 of a group may be configured to present a segment of a pipe on each of one or more displays 16 of the block, where the segment may be a bent segment or a straight segment of pipe, as shown in FIG. 8a. Another of the blocks of the group, then, may be configured to present a faucet and a countdown timer on one or more of its displays; and yet another of the blocks may be configured to present a destination of water from the faucet, such as a plant, water container, etc., as also shown in FIG. 8a (the countdown timer not being shown). When time reaches 0, the faucet may turn on and water begin to leak therefrom. The user, then, must arrange the blocks to connect the pipes between the faucet and destination such that the water does not leak, as shown in FIG. 8b. In this regard, the water may be considered to leak when there is either a faulty connection between the faucet and a segment of pipe, between two segments of pipe, or between a segment of pipe and destination; or when there is a lack of connection altogether.

Determining the proper arrangement of blocks 12 such that pipes are correctly connected between the faucet and destination may be accomplished, for example, by the blocks assigning one of two values to each side of the interactive face (e.g., 0, 1), where one value (e.g., 1) may represent the faucet, destination or a connectable end of a pipe segment, and the other value (e.g., 0) may represent an un-connectable end or intermediate portion (e.g., bend) of a pipe segment, as shown in FIG. 8a. One or more of the blocks may then determine for any particular side of a block adjacent a side of another block, if the sides are both assigned the same value (e.g., 1), and that value represents the faucet, destination or connectable end of a pipe segment. If so, the blocks may be considered properly connected; otherwise, the blocks may have a faulty connection, resulting in a leak at some point.

Further, the pipedream application may be configured to require a particular number of connected pipe segments between the faucet and destination. In such instances, the user may be notified of this requirement, such as by notifying the user that all displayed pipe segments must be connected, or by otherwise notifying the user that a predetermined number of the displayed pipe segments must be connected. This notification may be presented in a number of different manners, such as on one or more displays of one of the blocks (e.g., the faucet-displaying block). In such instances, the block notifying the user of the number of required segments may be configured to decrement the number of required segments as the user correctly arranges the blocks to add a segment to the growing arrangement of connected segments from the faucet. The number, then, may reach zero to thereby notify the user that the next block to be placed in the group should be the destination.

The blocks 12 may indicate to the user a correctly-connected pipe between the faucet and destination, or a water leak (e.g., flashing green or red LEDs 18 of the blocks). The event of water reaching the destination (in a correctly-connected pipe) or leaking may conclude a round of play, after which the blocks may be configured to reset the displays of the blocks to a next round (if a correctly-connected pipe) or the same round (if a leaking pipe). Blocks of the same round may include the same displays as before. But for a next and each subsequent round, the orientations of the pipe segments (bent or straight) may randomly change (to prevent using the same pipeline), as may the number of pipe segments required to connect the faucet and destination.

H. Jigsaw Puzzle

According to a jigsaw puzzle application, the user may upload an image to the computer, and from the computer 22 to the blocks 12 of a group. The computer (before upload to the blocks) or blocks themselves may divide the image into a number of regular or irregular "pieces," where the number of pieces may correspond to the number of blocks, as shown in FIG. 9a for the exemplary case of an "umbrella." Upon becoming operational, then, the blocks may be configured to present a piece of the image on each of one or more displays 16 of the respective blocks. The user may then be directed to arrange the blocks in order such that, once arranged, the group of blocks depicts the image, as shown in FIG. 9b. The blocks may indicate to the user a correct or incorrect arrangement of the image (e.g., flashing green or red LEDs 18 of the blocks, presenting a new image, etc.).

Similar to the spelling operations application, as blocks are placed proximate one another and/or at predetermined intervals (e.g., every five seconds), one or more blocks of the group may be configured to check the arrangement and orientation so as to determine whether the user has correctly arranged the blocks (or is in the process of correctly arranging the blocks). That is, the block(s) may be configured to check if the arranged blocks present pieces of the image and in the correct arrangement. In this regard, the blocks may be configured so as to know the correct arrangement of blocks relative to their group IDs so that a block sensing adjacent blocks may know if those adjacent blocks are properly arranged adjacent to it. In addition, the blocks may be configured to check if the arranged blocks are arranged such those blocks have the same orientation as to the display of their respective letters.

Checking the orientation of the blocks may be accomplished, for example, by the blocks assigning a value to each side of the interactive face (e.g., 1-4), where each value may correspond to an orientation (e.g., normal, 90° clockwise, 90° counterclockwise, upside-down) of the displayed letter. One or more of the blocks may then determine for any particular side of a block adjacent a side of another block, if the side of the other block is assigned the same value as the value of the side parallel the particular side of the respective block. Thus, presume the interactive face of each of two blocks has sides valued 1, 2, 3 and 4, where sides 1 and 3 are parallel one another, and sides 2 and 4 are parallel one another. Once the blocks are placed adjacent one another, one or both of those blocks, or another block, may determine if side 2 of one block is adjacent side 4 of the other block, or if side 1 of one block is adjacent side 3 of the other block. These situations may be indicative of the pieces of the image presented on the interactive faces being in the same orientation with respect to one another.

I. Simon

According to a Simon application, upon becoming operational, each of a number of blocks 12 of a group may be configured to present a respective color (or image, character, number, symbol or the like) on each of one or more displays 16 of the block. The blocks may flash their respective colors in a random-sequence of one or more colors; and the user may be directed to thereafter repeat the same sequence, tapping each block of the respective sequence with the utility block in the same order. The blocks may indicate to the user a correct or incorrect repeated sequence (e.g., flashing green or red LEDs 18 of the blocks). The event of a correct or incorrect repeated sequence may conclude a round of play, after which the blocks may be configured to flash another random-sequence of colors. Blocks of the same round may flash the same sequence as before, or another sequence of the same number as before. But for a next and each subsequent round, the sequence may increase in the number.

J. Concentration

According to a Concentration application, each of a plurality of pairs of blocks 12 of a group may be loaded with a respective image (or color, character, number, symbol or the like). Upon becoming operational, the displays 16 of the blocks may be blank; but upon being tapped by the utility block to thereby select the block), may present their loaded image for a limited duration (e.g., 2 seconds), after which the display may return to being blank. The user may be directed to select two blocks during a turn, with the object being to select two blocks loaded with the same image. In this regard, if the two selected blocks do have the same image, the blocks may continue to present the image following the limited duration. The user may then continue selecting blocks to uncover the remaining pairs of blocks in a similar manner. In a manner similar to that above, after all of the pairs of blocks have been uncovered, the blocks may be reset and loaded with different images (or the images may be rotated among the blocks in a random or pseudorandom manner.

K. Tic-Tac-Toe/Connect-4

According to a Tic-Tac-Toe application, the blocks 12 of a group of nine may be arranged in a 3×3 grid. Upon becoming operational, each block may be capable of selectively presenting, on one or more respective displays 16, an "X" or an "O" mark (or one of two colors, images, characters, numbers, symbols or the like) upon being selected by a user using the utility block to tap the block (may employ one or two utility blocks) or using the computer 22. Each user is assigned a mark, and the users may then take turns selecting blocks until one of the users achieves three of the user's marks ("X" or "O") in a horizontal, vertical or diagonal row—thereby winning the game; or until the blocks have been selected such that neither user may achieve three blocks in a row—thereby resulting in a draw.

Similar to Tic-Tac-Toe, according to a connect-4 application, the blocks of a group of blocks (e.g., 42 blocks) may be arranged in a grid (e.g., 7×6 grid). Upon becoming operational, each block may be capable of selectively presenting, on one or more respective displays 16, an "X" or an "O" mark (or one of two colors, images, characters, numbers, symbols or the like) upon being selected by a user using the utility block to tap the block (may employ one or two utility blocks) or using the computer 22. Each user is assigned a mark, and building from a row of the grid designated as the bottom row, the users may take turns selecting blocks until one of the users achieves four of the user's marks ("X" or "O") in a horizontal, vertical or diagonal row—thereby winning the game; or until the blocks have been selected such that neither user may achieve four blocks in a row—thereby resulting in a draw.

In either of the aforementioned applications, after one of the users win or the game results in a draw, the blocks may be reset and ready for a new game.

L. Informational Applications

In addition to a number of game-related applications, the applications according to which the blocks 12 may operate may include one or more informational applications. These applications may be self contained with in the blocks, or may be paired with the docking station 20 and/or computer 22 to present desired information to the user. These applications, and the information presented by the blocks may include, for example, an email-display application in which the computer may automatically send a notification to one or more of the blocks when the user receives a new email; during or after which, the block may present, on one or more of its displays 16, a simple alert (changing color) and/or a portion or snippet of the received email.

The informational applications may also include a weather-display application in which one or more of the blocks 12 may present a color or graphic to indicate a particular weather forecast. In these applications, different blocks, or faces of the same or different blocks, may be configured to present the forecast for a different day of the week (6-day weather), or a different aspect of the same day's forecast (humidity, precipitation, high, low, etc). Similarly, then, the informational applications may include a calendar-display application in which different blocks, or faces of the same or different blocks, may be configured to present different days of a week, hours of a day, or the like; and may additionally synchronize to a calendaring application on the computer 22 to include scheduled events of the user in the respective displays.

In another informational application, namely an online calling or instant messaging-display application, one or more of the blocks 12 may indicate when the user and/or one or more of the user's contacts are online, when the user has missed one or more calls, and/or when receiving a call according to any of a number of different online calling or instant messaging services (e.g., Skype).

In other informational applications, one or more of the blocks 12 may be configured to present a countdown timer where different blocks, or different faces of the same or different blocks, may present different timers. Similarly, one or more of the blocks 12 may be configured to present a clock where different blocks, or different faces of the same or different blocks, may present clocks keeping time for different time zones. And in yet another informational application, one or more of the blocks 12 may be configured to present digital pictures or images where different blocks, or different faces of the same or different blocks, may present different pictures.

According to one exemplary aspect of the present invention, functions performed by one or more of the blocks 12, docking station 20 and/or computer 22, may be performed by various means, such as hardware and/or firmware, including those described above, alone and/or under control of a computer program or computer software. The computer program may be part of a computer program product for performing one or more functions of exemplary embodiments of the present invention. This computer program product may include a computer-readable storage medium, such as the non-volatile storage medium, and software including computer-readable program code portions, such as a series of computer instructions, embodied in the computer-readable storage medium.

In this regard, FIGS. 3 and 4 are flowcharts of apparatuses, methods and program products according to exemplary embodiments of the present invention. It will be understood that each block or step of the flowcharts, and combinations of blocks in the flowcharts, can be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (i.e., hardware) create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
a housing including a plurality of faces, the plurality of faces including at least a first face and adjoining second and third faces, the first and second faces lying in planes that cut one another, the third face lying in a plane that cuts the planes in which the first and second faces lie;
a display configured to present information to a user;
a communication interface configured to exchange data with a plurality of other apparatuses;
a plurality of detection components each of which is located proximate a respective face of the housing, each of the detection components being configured to detect proximity of a respective face of the housing of the apparatus with respect to a housing of one or more of the other apparatuses, wherein the plurality of detection components include at least a first detection component located proximate the first face, a second detection component located proximate the second face, and a third detection component located proximate the third face, the apparatus thereby supporting a two-dimensional arrangement of apparatuses; and
a processor configured to communicate with the display, communication interface and detection components,
wherein the apparatus is configured to operate in a standby mode in which the processor is configured to assign a unique group identifier to the apparatus,
wherein the apparatus is configured to operate in an operation mode during which the a apparatus is grouped and arranged in proximity with other apparatuses to form an arranged group of apparatuses, each of the other apparatus having an assigned unique identifier, the processor and each of the other apparatuses being configured to maintain its assigned group identifier or reassign its group identifier so that all of the apparatuses of the group have a common group identifier,
wherein during the grouping of the apparatus with the other apparatuses and assignment of the common group identifier, the processor is configured to maintain a timestamp of a last instance of the apparatus being placed in proximity with any of the other apparatuses, and receive timestamps from the other apparatuses of respective last instances of the other apparatuses being placed in proximity with one another the processor being configured to participate in assignment of the common group identifier only with other apparatuses whose timestamps are within a predetermined threshold of the timestamp maintained by the processor,
wherein as the apparatus and the other apparatuses are grouped and assigned the common identifier, the processor is configured to receive corresponding indications from the detection components, and receive data from the other apparatuses in the group via the communication interface, and
wherein the processor is configured to calculate an output as a function of the number of apparatuses in the group and arrangement of one or more apparatuses in the group, the number and arrangement being determinable based upon the indications and received data, and wherein the processor is configured to communicate the calculated output via the display.

2. An apparatus according to claim 1 further comprising:
a user input interface configured to receive input from the user,
wherein the communication interface is further configured to exchange data with a computer during a programming of the apparatus for operation,
wherein during programming of the apparatus, the user input interface is configured to receive input from the user to select the apparatus, the communication interface being configured to communicate the selection of the apparatus to the computer for receipt thereat, the computer also being configured to receive selection of one or more conditional programming statements within which to reference the selected apparatus.

3. An apparatus according to claim 1, wherein the communication interface is further configured to exchange data with a computer during a programming of the apparatus for operation,
wherein during programming of the apparatus, the processor is configured to record one or more actions of the apparatus directed by the user and a state of the apparatus relative to the one or more actions, the communication interface being configured to communicate the recorded one or more actions and state to the computer for reference in one or more conditional programming statements.

4. An apparatus according to claim 1 further comprising:
a user interface configured to communicate information to the user, the user interface including the display,
wherein the communication interface is further configured to exchange data with a computer during a programming of the apparatus for operation,
wherein during programming of the apparatus, the computer is configured to receive selection of the apparatus and one or more conditional programming statements within which to reference the selected apparatus, and
wherein during programming of the apparatus, the communication interface is configured to receive the selection of the apparatus, and the user interface is configured to provide feedback to the user to thereby permit the user to confirm selection of the apparatus.

5. An apparatus according to claim 1, wherein the detection components are configured to detect an orientation of the apparatus, wherein in response to corresponding indications from the detection components, the processor is configured to identify an upwardly-facing face of the housing as an interactive face for presentation of information by the display located thereon.

6. An apparatus according to claim 5, wherein the detection components are configured to detect a change in orientation of the apparatus resulting in another face of the housing becoming the upwardly-facing face, wherein in response to corresponding indications from the detection components, the processor is configured to identify the other face as the upwardly-facing face as the interactive face for presentation of information by the display located thereon.

7. An apparatus according to claim 1, wherein one of the other apparatuses is configured to function as a utility apparatus for selecting apparatuses in the group of apparatuses, and
wherein when the utility apparatus is placed in proximity with the apparatus to select the apparatus, the processor is configured to receive corresponding indications from the detection components, and in response thereto, calculate an output reflecting selection of the apparatus by the utility apparatus, and communicate the calculated output via the display.

8. An apparatus according to claim 7, wherein one of the other apparatuses is configured to function as the utility apparatus for further de-selecting selected apparatuses in the group of apparatuses,
wherein when the utility apparatus is placed in proximity with the apparatus after having been placed in proximity with the apparatus to select the apparatus, the processor is configured to receive corresponding indications from the detection components, and in response thereto, calculate an output reflecting de-selection of the apparatus by the utility apparatus, and communicate the calculated output via the display.

9. An apparatus according to claim 1, wherein the processor is configured to determine an orientation of the apparatus with respect to one or more other apparatuses of the group of apparatuses, and wherein the processor is configured to calculate the output further as a function of the orientation of the apparatus.

10. An apparatus according to claim 9, wherein the processor being configured to determine an orientation of the apparatus includes being configured to determine an orientation of information presented by the display with respect to information presented by a display of each of one or more other apparatuses of the group of apparatuses.

11. A method comprising:

providing an apparatus comprising:
a housing including a plurality of faces, the plurality of faces including at least a first face and adjoining second and third faces, the first and second faces lying in planes that cut one another, the third face lying in a plane that cuts the planes in which the first and second faces lie;
a display configured to present information to a user;
a communication interface configured to exchange data with a plurality of other apparatuses;
a plurality of detection components each of which is located proximate a respective face of the housing, each of the detection components being configured to detect proximity of a respective face of the housing of the apparatus with respect to a housing of one or more of the other apparatuses, wherein the plurality of detection components include at least a first detection component located proximate the first face, a second detection component located proximate the second face, and a third detection component located proximate the third face, the apparatus thereby supporting a two-dimensional arrangement of apparatuses; and
a processor configured to communicate with the display, communication interface and detection components, wherein the apparatus is configured to operate in a standby mode in which the processor is configured to assign a unique group identifier to the apparatus, wherein the apparatus is configured to operate in an operation mode during which the a apparatus is grouped and arranged in proximity with other apparatuses to form an arranged group of apparatuses, each of the other apparatus having an assigned unique identifier, the processor and each of the other apparatuses being configured to maintain its assigned group identifier or reassign its group identifier so that all of the apparatuses of the group have a common group identifier, wherein during the grouping of the apparatus with the other apparatuses and assignment of the common group identifier, the processor is configured to maintain a timestamp of a last instance of the apparatus being placed in proximity with any of the other apparatuses, and receive timestamps from the other apparatuses of respective last instances of the other apparatuses being placed in proximity with one another the processor being configured to participate in assignment of the common group identifier only with other apparatuses whose timestamps are within a predetermined threshold of the timestamp maintained by the processor, wherein as the apparatus and the other apparatuses are grouped and assigned the common identifier, the method further comprises at the processor, receiving corresponding indications from the detection components, and receiving data from the other apparatuses in the group via the communication interface, and calculating an output as a function of the number of apparatuses in the group and arrangement of one or more apparatuses in the group, the number and arrangement being determinable based upon the indications and received data; and communicating the calculated output via the display.

12. A method according to claim 11, wherein providing an apparatus comprises providing an apparatus further comprising a user input interface configured to receive input from the user, wherein the communication interface is further configured to exchange data with a computer during a programming of the apparatus for operation, and wherein during programming of the apparatus, the method further comprises:

receiving input from the user at the user input interface to select the apparatus; and communicating the selection of the apparatus via the communication interface to the computer for receipt thereat, the computer also being configured to receive selection of one or more conditional programming statements within which to reference the selected apparatus.

13. A method according to claim 11, wherein the communication interface is further configured to exchange data with a computer during a programming of the apparatus for operation, and wherein during programming of the apparatus, the method further comprises:

recording at the processor one or more actions of the apparatus directed by the user and a state of the apparatus relative to the one or more actions; and communicating the recorded one or more actions and state via the communication interface to the computer for reference in one or more conditional programming statements.

14. A method according to claim 11, wherein providing an apparatus comprises providing an apparatus further comprising a user interface configured to communicate information to the user, the user interface including the display, wherein the communication interface is further configured to exchange data with a computer during a programming of the apparatus for operation, wherein during programming of the apparatus, the computer is configured to receive selection of the apparatus and one or more conditional programming statements within which to reference the selected apparatus, and wherein during programming of the apparatus, the method further comprises:

receiving the selection of the apparatus via the communication interface; and providing feedback to the user via the user interface to thereby permit the user to confirm selection of the apparatus.

15. A method according to claim 11, wherein providing an apparatus comprises providing an apparatus the display of which comprises a plurality of displays each of which is located on a respective face of the housing, and wherein the method further comprises:

detecting an orientation of the apparatus at the detection components; and in response to corresponding indications from the detection components, identifying at the processor an upwardly-facing face of the housing as an interactive face for presentation of information by the display located thereon.

16. A method according to claim 15 further comprising:
detecting a change in orientation of the apparatus resulting in another face of the housing becoming the upwardly-facing face; and in response to corresponding indications from the detection components,
identifying at the processor the other face as the upwardly-facing face as the interactive face for presentation of information by the display located thereon.

17. A method according to claim 11, wherein one of the other apparatuses is configured to function as a utility apparatus for selecting apparatuses in the group of apparatuses, and wherein when the utility apparatus is placed in proximity with the apparatus to select the apparatus, the method further comprises:
receiving at the processor corresponding indications from the detection components; and in response thereto,
calculating an output reflecting selection of the apparatus by the utility apparatus, and communicate the calculated output via the display.

18. A method according to claim 17, wherein one of the other apparatuses is configured to function as the utility apparatus for further de-selecting selected apparatuses in the group of apparatuses, wherein when the utility apparatus is placed in proximity with the apparatus after having been placed in proximity with the apparatus to select the apparatus, the method further comprises:
receiving at the processor corresponding indications from the detection components; and in response thereto,
calculating an output reflecting de-selection of the apparatus by the utility apparatus, and communicate the calculated output via the display.

19. A method according to claim 11 further comprising:
determining at the processor an orientation of the apparatus with respect to one or more other apparatuses of the group of apparatuses, and
wherein calculating the output comprises calculating the output further as a function of the orientation of the apparatus.

20. A method according to claim 19, wherein determining the orientation comprises determining at the processor an orientation of information presented by the display with respect to information presented by a display of each of one or more other apparatuses of the group of apparatuses.

* * * * *